Sept. 2, 1924.

G. S. CARRICK

BUMPER

Filed May 26, 1922

1,507,273

Inventor,
Gerald S. Carrick,

Patented Sept. 2, 1924.

1,507,273

UNITED STATES PATENT OFFICE.

GERALD S. CARRICK, OF CHICAGO, ILLINOIS.

BUMPER.

Application filed May 26, 1922. Serial No. 563,960.

*To all whom it may concern:*

Be it known that I, GERALD S. CARRICK, a citizen of the United States, residing at 538 South Clark Street, Chicago, in the county of Cook and State of Illinois, have invented a new and useful Improvement in Bumpers, of which the following is a specification.

This invention relates to improvements in bumpers for vehicles. I have shown a bumper, embodying the features of my invention, adapted for use on an automobile, although it is obvious that without detracting from the spirit of my invention it may be used on other vehicles.

Figure 1:
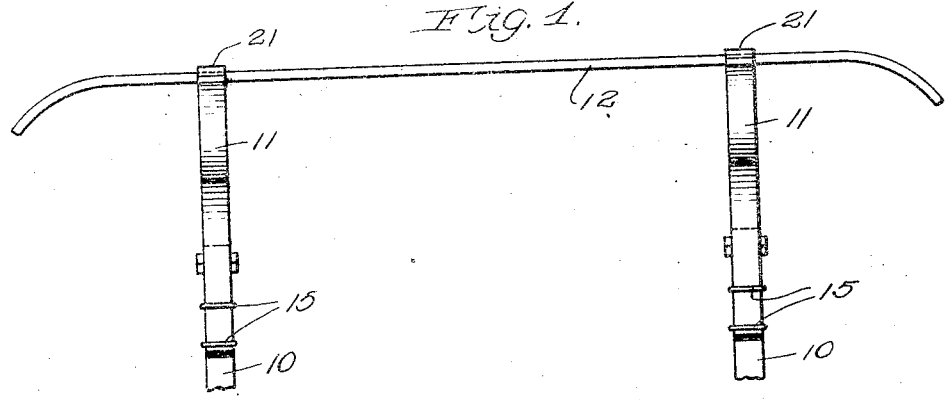
Figure 2:
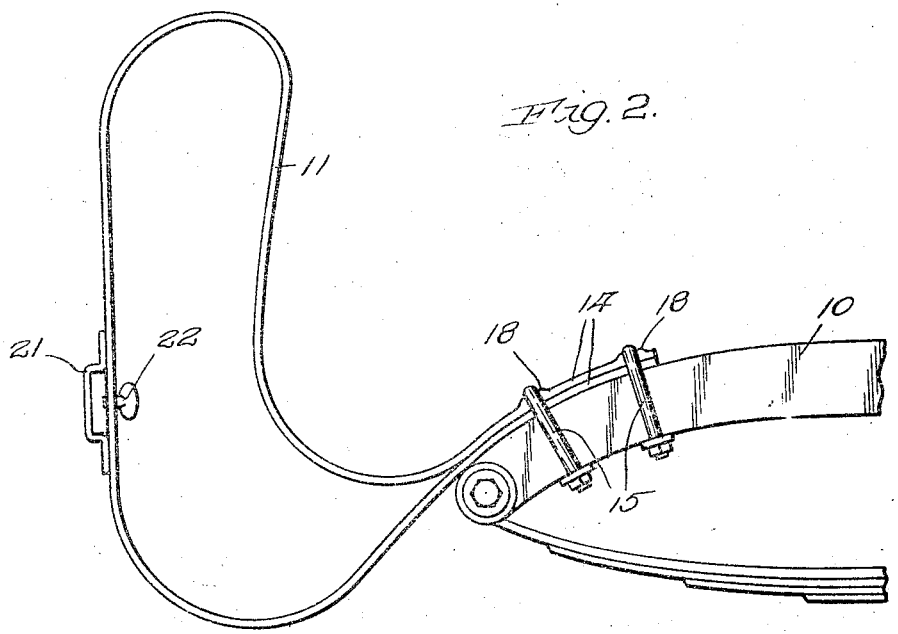
Figures 3, 4:
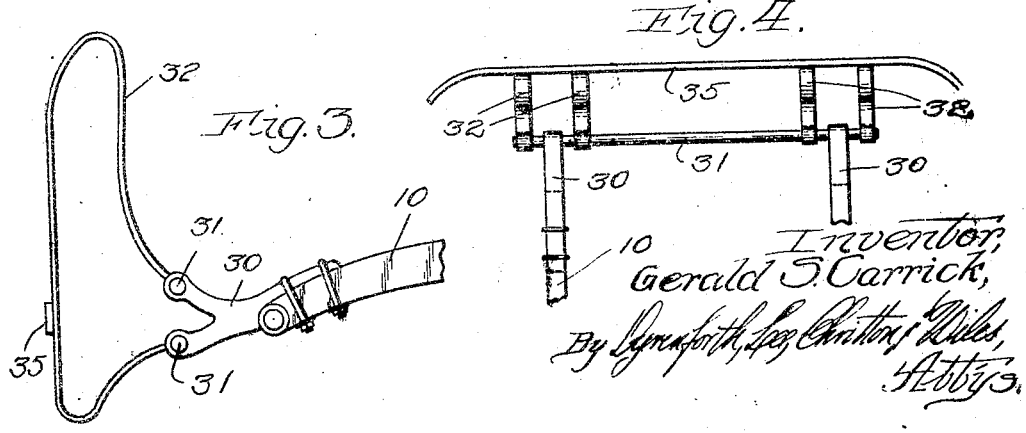

A device embodying the features of my invention is shown in the accompanying drawings in which:

Fig. 1 is a top plan view of a bumper mounted on the forward end of an automobile, Fig. 2 is a view of the same in side elevation, with the horizontal bar removed, Fig. 3 is a view similar to Fig. 2 showing a modified form of device, and Fig. 4 is a top plan view of the same.

As shown in the drawings, 10 indicates the forward ends of the side members of the chassis or frame of an automobile. Such ends of the side members of the frame frequently project and are often referred to as "spring horns". I have shown my improved bumper as attached to these "spring horns", although it is obvious that, without detracting from the spirit of this invention, and with but slight modifications or changes, if necessary, the bumper could be attached to other parts of a vehicle.

The device comprises primarily two vertically arranged elongated loops 11 made of flat spring steel, and a horizontal bar 12. The ends 14 of the spring steel from which the loops 11 are formed, are brought together and placed on top of the end of the side member 10 of the frame of the automobile. The loops 11 are held in position by shackles 15 which draw them up tightly against the upper side of the member 10 and hold them in place. Projections or bosses 18 are provided to prevent slippage. Each of the loops 11 has attached to its forward side, near the bottom, a part 21 adapted to accommodate the cross-bar 12. Opposite the part 21 is provided a set screw 22 adapted to be screwed in against the bar 12 to hold it in place. It will be noted that by this construction adjustment of the two loops 11 is permitted in order to accommodate them to vehicles of different widths.

In Figs. 3 and 4 I have shown a modified form of device. The device shown in these figures comprises two castings 30 adapted to be attached to the ends of the side members of the frame 10 in the same manner as the loops 11 are attached in the preferred form. The castings 30 are forked at their forward ends, and carry two horizontal bars 31, arranged one above the other. The bars 31 carry four loops 32 which resemble the loops 11 in the preferred form. The loops 32 carry a horizontal bar 35 on their forward sides, near the bottom. The bar 35 is shown in the modified form as being welded or otherwise fastened to the loops 22 without adjustment being permitted. In this modified form, side-way adjustment of the loops 32 is not necessary, since the castings 30 can be moved on the rods 31 in order to accommodate them to vehicles of varying widths.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim as new, and desire to secure by Letters Patent, is:

1. A bumper comprising two forked castings adapted to be attached to the ends of the side members of a vehicle, the forked ends of said castings carrying two parallel horizontal bars, and a plurality of substantially vertically arranged elongated loops formed of spring steel mounted on said bars.

2. A bumper comprising two forked castings adapted to be attached to the ends of the side members of a vehicle, the forked ends of said castings carrying two parallel horizontal bars, and a plurality of substantially vertically arranged elongated loops formed of spring steel mounted on said bars, said loops carrying on their forward sides a horizontally arranged bar.

In testimony whereof I have hereunto set my hand this 21st day of November, 1921.

GERALD S. CARRICK.